(12) United States Patent
Sakaguchi

(10) Patent No.: US 9,091,855 B2
(45) Date of Patent: Jul. 28, 2015

(54) BEAM SPLITTER AND OBSERVATION APPARATUS

(71) Applicant: Panasonic Healthcare Holdings Co., Ltd., Minato-ku, Tokyo (JP)

(72) Inventor: Akira Sakaguchi, Osaka (JP)

(73) Assignee: PANASONIC HEALTHCARE HOLDINGS CO., LTD. (JP)

( * ) Notice: Subject to any disclaimer, the term of this patent is extended or adjusted under 35 U.S.C. 154(b) by 224 days.

(21) Appl. No.: 13/863,016

(22) Filed: Apr. 15, 2013

(65) Prior Publication Data

US 2013/0229707 A1    Sep. 5, 2013

Related U.S. Application Data

(63) Continuation of application No. PCT/JP2012/074044, filed on Sep. 20, 2012.

(30) Foreign Application Priority Data

Sep. 30, 2011  (JP) ................................ 2011-218015

(51) Int. Cl.
  *G02B 27/10* (2006.01)
  *G02B 21/18* (2006.01)
  (Continued)

(52) U.S. Cl.
  CPC ................ *G02B 27/10* (2013.01); *G02B 21/02* (2013.01); *G02B 21/18* (2013.01); *G02B 27/1066* (2013.01); *G02B 27/144* (2013.01)

(58) Field of Classification Search
  CPC .............................. G02B 27/10; G02B 27/144
  USPC ........................................................ 359/372
  See application file for complete search history.

(56) References Cited

U.S. PATENT DOCUMENTS 1,253,138 A * 1/1918 Brewster ........................ 359/636
1,759,914 A * 5/1930 Pilny .............................. 352/44
(Continued)

FOREIGN PATENT DOCUMENTS

CN    1922510 A    2/2007
JP    2-504318 A    12/1990
(Continued)

OTHER PUBLICATIONS

Chinese Office Action corresponding to Application No. 201280002701.8; Date of Mailing: Feb. 2, 2015.

*Primary Examiner* — Jordan Schwartz
*Assistant Examiner* — George G King
(74) *Attorney, Agent, or Firm* — Cantor Colburn LLP

(57) ABSTRACT

An observation apparatus comprising: a beam-splitter including first and second plane-parallel plates respectively having first and second faces and third and fourth faces parallel to one another, and a light-splitting section allowing T % of incident light from a first-and-third-face side to pass therethrough to a second-and-fourth-face side, as transmitted light, while reflecting (100–T) % thereof in a direction parallel with the first to fourth faces as reflected light; and first and second observation optical systems to observe an entire observation target and partially magnify and observe the target, respectively, the first and second plane-parallel plates including light-reducing sections, allowing T % of the incident light to pass therethrough, in areas through which neither the incident nor transmitted light pass, the beam splitter arranged so that the first and third faces oppose the target and the transmitted and reflected lights are guided to the first and second observation optical systems, respectively.

10 Claims, 14 Drawing Sheets

(51) Int. Cl.
*G02B 27/14* (2006.01)
*G02B 21/02* (2006.01)

(56) References Cited

U.S. PATENT DOCUMENTS

| | | | |
|---|---|---|---|
| 1,989,317 A | * | 1/1935 | Harper .......................... 359/638 |
| 4,673,973 A | * | 6/1987 | Ledley ........................... 348/79 |
| 4,769,698 A | | 9/1988 | Ledley et al. |

| | | | |
|---|---|---|---|
| 2004/0017607 A1 | * | 1/2004 | Hauger et al. ................ 359/376 |
| 2014/0247482 A1 | * | 9/2014 | Doi et al. ...................... 359/363 |

FOREIGN PATENT DOCUMENTS

| | | |
|---|---|---|
| JP | 5-232385 A | 9/1993 |
| JP | 2002-148526 A | 5/2002 |
| JP | 2004-4549 A | 1/2004 |
| JP | 2004-318181 A | 11/2004 |
| WO | 2005081020 A1 | 9/2005 |

* cited by examiner

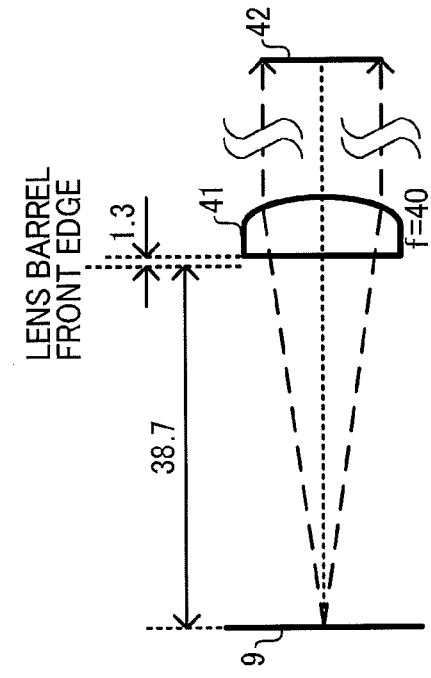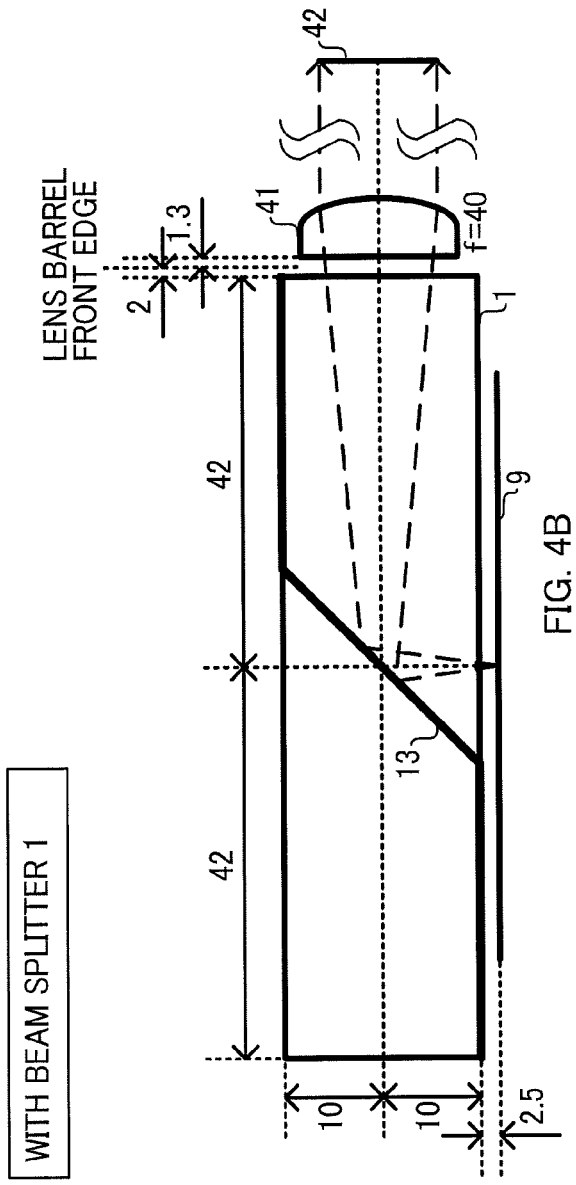

BEAM SPLITTER AND OBSERVATION APPARATUS

CROSS-REFERENCE TO RELATED APPLICATIONS

This is a continuation under 35 U.S.C. §120 of International Patent Application No. PCT/JP2012/074044 filed Sep. 20, 2012. Priority under 35 U.S.C. §119 (a) and 35 U.S.C. §365(b) is claimed from Japanese Patent Application No. 2011-218015 filed Sep. 30, 2011. The full contents of the International Patent Application are incorporated herein by reference.

BACKGROUND OF THE INVENTION

1. Field of the Invention

The present invention relates to a beam splitter and an observation apparatus.

2. Description of the Related Art

Microscopes in observation apparatuses include an optical system for magnifying and observing a part of an observation target (hereinafter referred to as a magnification observation optical system). Further, Japanese Unexamined Patent Application Publication No. 5-232385 and Japanese Unexamined Patent Application Publication No. 2002-148526, for example, disclose a microscope (device) includes an optical system for observing an entire observation target (hereinafter, referred to as an entire observation optical system) in addition to the magnification observation optical system. As such, by providing the magnification observation optical system and the entire observation optical system, both the magnification observation and the entire observation of the observation target can be performed by switching the optical systems.

In the microscope (device) according to Japanese Unexamined Patent Application Publication No. 5-232385 and Japanese Unexamined Patent Application Publication No. 2002-148526, since an optical axis of the magnification observation optical system and an optical axis of the entire observation optical system do not match each other, a stage needs to be moved when the magnification observation is performed and when the entire observation is performed, with respect to the same observation target. Thus, while the magnification observation is being performed, a field of view is narrow and thus it is difficult to perceive which spot in the observation target is currently being observed. Particularly, if a large number of wells are sequentially magnified and observed such as in the case where the observation target is for example, e.g., a micro plate for cell culture, an observer might lose the order thereof in the middle of the observation.

Thus, as illustrated in FIG. 14, for example, the optical axis of the entire observation optical system including a camera 3 and a lens 30 for entire observation and the optical axis of the magnification observation optical system including a camera 4 and a lens 40 for magnification observation can be matched each other by using a semitransparent mirror 2. In such an observation apparatus, the magnification observation can be performed while keeping track of the current observation spot by displaying a pair of images picked up substantially at the same time by the cameras, respectively, on a display, for example.

However, in the observation apparatus illustrated in FIG. 14, the magnification observation lens 40 such as a microscope objective lens cannot be brought closer to an observation target 9 than it is as described in FIG. 14 with a distance of D/2+α therefrom, where D denotes a dimension such as a length or a width of the observation target 9, and α denotes a distance with which the semitransparent mirror 2 and the magnification observation lens 40 do not interfere with each other. And if an entrance pupil diameter EP of the magnification observation lens 40 is approximated by an outer diameter of this lens, it can be expressed by α≈EP/2.

Thus, a (maximum) numerical aperture (NA) of the magnification observation lens 40 is expressed as follows:

$$NA = n0 \cdot \sin\theta$$
$$\approx (EP/2)/(D/2 + \alpha)$$
$$\approx EP/(D + EP)$$

and NA is decreased in accordance with D, where n0 is a refractive index of air and n0≈1 is assumed, and θ is an aperture angle of the magnification observation lens 40 (angle of an entrance pupil of the lens with respect to an object point of the observation target 9 on the optical axis of the magnification observation optical system). Therefore, (theoretical) resolution δ (=0.61λ/NA) of the magnification observation lens 40 is increased in accordance with D (deteriorates), where λ is a wavelength of incident light.

Further, depending on D/2+α, the magnification observation lens 40 with a long operation distance (in the case of a microscope objective lens, a distance between its lens barrel front edge and the object point) is needed.

SUMMARY OF THE INVENTION

An observation apparatus according to an aspect of the present invention, includes: a beam splitter including a first plane parallel plate, having first and second faces parallel to each other, with a refractive index higher than a refractive index of air, a second plane parallel plate, having third and fourth faces arranged to be on the same level as the first and the second faces, respectively, with a refractive index equal to a refractive index of the first plane parallel plate, and a light splitting section arranged between the first and the second plane parallel plates, the light splitting section configured to allow T % (0<T<100) of incident light incident from a first-and-third-face side to pass therethrough to a second-and-fourth-face side, as well as reflect (100−T) % of the incident light incident from the first-and-third-face side to a direction in parallel with the first to the fourth faces; a first observation optical system configured to observe an entire observation target; and a second observation optical system configured to magnify and observe a part of the observation target, the first and the second plane parallel plates each provided with a light reducing section in an area therein through which neither the incident light incident from the first-and-third-face side onto the light splitting section nor transmitted light from the light splitting section to the second-and-fourth-face side pass, the light reducing section configured to allow T % of the incident light incident from the first-and-third-face side to pass therethrough to the second-and-fourth-face side, the beam splitter arranged so that the first and the third faces are opposed to the observation target; the transmitted light passed through the light splitting section and the transmitted light passed through the light reducing section are guided to the first observation optical system; and reflected light reflected by the light splitting section is guided to the second observation optical system.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 4A is a diagram for describing an operation distance of a magnification observation lens 40 without a beam splitter 1;

FIG. 4B is a diagram for describing an operation distance of a magnification observation lens 40 with a beam splitter 1;

DETAILED DESCRIPTION OF THE INVENTION

At least the following details will become apparent from descriptions of this specification and of the accompanying drawings.

===Configurations of Beam Splitter and Observation Apparatus===

Configurations of a beam splitter and an observation apparatus according to an embodiment of the present invention will be described hereinafter referring to FIGS. 1 and 2.

Figure 2:
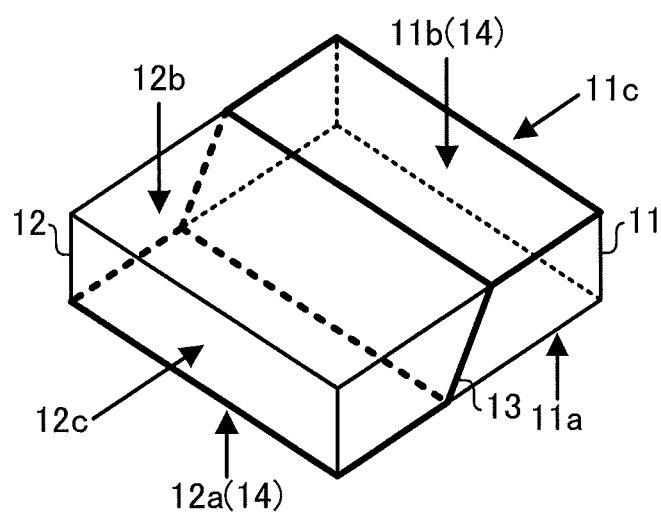
FIG. 2 is a perspective view illustrating a configuration of a beam splitter according to an embodiment of the present invention.

FIG. 2 illustrates a configuration of the beam splitter according to an embodiment of the present invention. The beam splitter 1 illustrated in FIG. 2 includes plane parallel plates 11 and 12 and a semitransparent mirror 13.

The (first) plane parallel plate 11 is formed in a trapezoidal columnar shape, and has a face 11a (first face) and a face 11b (second face) parallel to each other, three vertical faces orthogonal to such parallel faces, and one inclined face forming an angle of 45° (135°) therewith. The (second) plane parallel plate 12 is formed in the same shape as that of the plane parallel plate 11, and has a face 12a (third face) and a face 12b (fourth face) parallel to each other. The plane parallel plates 11 and 12 are arranged such that the parallel faces of the plane parallel plates 11 and 12 lie on the same planes, respectively, and the inclined faces thereof are opposed to each other with the semitransparent mirror 13 arranged therebetween, which results in the beam splitter 1 in a rectangular parallelepiped shape as a whole.

The plane parallel plates 11 and 12 are made of the same material with a refractive index higher than at least that of air, and preferably, are formed of a material with a high refractive index such as glass with a refractive index equal to or more than 1.5. In the following description, the material for the plane parallel plates 11 and 12 is assumed to be glass with a refractive index of n=1.5, for example.

The semitransparent mirror 13 constitutes a light splitting section in an embodiment of the present invention, and is configured to allow approximately 50% of incident light to pass therethrough and reflect remaining approximately 50% thereof. As described above, since the semitransparent mirror 13 is arranged between the inclined faces of the plane parallel plates 11 and 12, approximately 50% of the incident light incident from the lower side (faces 11a and 12a side) in FIG. 2 is allowed to pass therethrough to the upper side (faces 11b and 12b side), while the remaining approximately 50% thereof is reflected to the direction of the face 11c (direction in parallel with the parallel faces of the plane parallel plates 11 and 12). In the incident light incident onto the semitransparent mirror 13 from the upper side in FIG. 2, approximately 50% thereof is allowed to pass therethrough to the lower side, while the remaining approximately 50% is reflected to the direction of the face 12c.

Further, the plane parallel plates 11 and 12 have a light reducing film 14 with a transmittance of approximately 50% attached onto the face 11b and the face 12a which continues into the (reflective face of) the semitransparent mirror 13, respectively, and constitute a light reducing section in an embodiment of the present invention. Therefore, as a whole, the beam splitter 1 allows approximately 50% of the incident light incident from the lower side (or the upper side) in FIG. 2 to pass therethrough.

Figure 1:
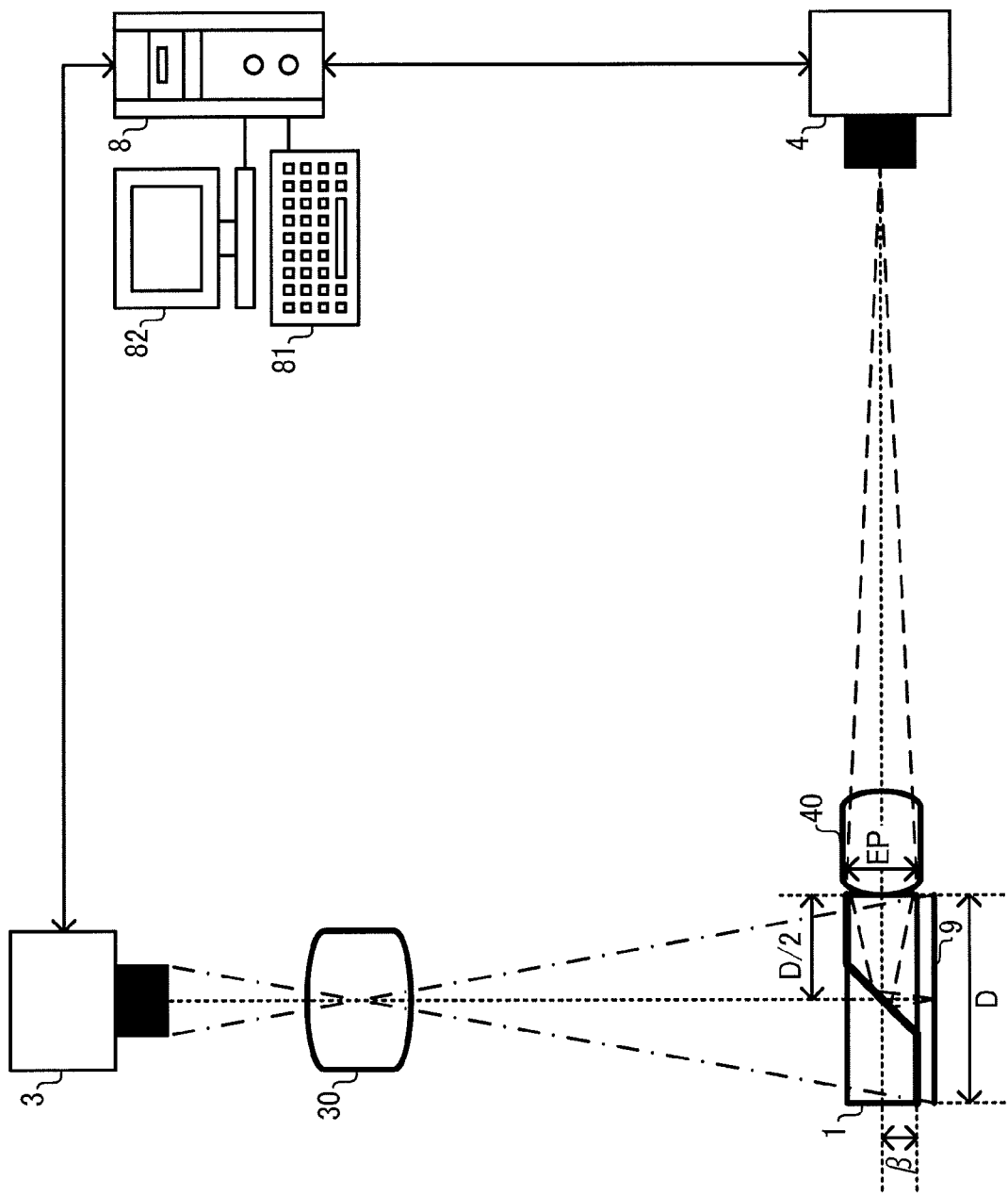
FIG. 1 is a schematic diagram illustrating a configuration of an entire observation apparatus including a beam splitter according to an embodiment of the present invention.

FIG. 1 illustrates a configuration of the entire observation apparatus including the beam splitter 1. The observation apparatus illustrated in FIG. 1 includes an entire observation optical system, a magnification observation optical system, and a computer 8, in addition to the beam splitter 1.

The entire observation optical system (first observation optical system) includes an entire observation camera 3 and an entire observation lens 30. The magnification observation optical system (second observation optical system) includes a magnification observation camera 4 and a magnification observation lens 40. For example, e.g., a CCD camera and a CMOS camera are used for the entire observation camera 3 and the magnification observation camera 4.

In the beam splitter 1, the lower side (faces 11a and 12a side) in FIG. 2 is opposed to an observation target 9, and the beam splitter 1 is arranged such that transmitted light passed through the semitransparent mirror 13 and transmitted light passed through the light reducing film 14 are guided to the entire observation optical system, and the reflected light reflected by the semitransparent mirror 13 is guided to the magnification observation optical system. The magnification observation lens 40 such as a microscope objective lens is arranged adjacent to the face 11c of the beam splitter 1 in FIG. 2.

With such an arrangement, the entire observation camera 3 can pick up an entire image of the observation target 9 with a light reduction rate of approximately 50% (100%—transmittance of approximately 50%) passed through the beam splitter 1. Further, the magnification observation camera 4 can pick up a magnified image of the observation target 9 with a light reduction rate of approximately 50% (100%—reflectance of approximately 50%) reflected by the beam splitter 1.

The computer 8 is provided with an input device such as a keyboard 81 and an output device such as a display 82. The computer 8 is configured to control the entire observation camera 3 and the magnification observation camera 4 in accordance with an input from for example, e.g., the keyboard 81, and display an entire image and a magnified image of the observation target 9 respectively picked up by the cameras on the display 82.

With such a configuration, the observation apparatus according to an embodiment of the present invention can match the optical axis of the entire observation optical system with the optical axis of the magnification observation optical system between the observation target 9 and the semitransparent mirror 13 of the beam splitter 1. Therefore, for example, the entire image and the magnified image of the observation target 9 are picked up substantially at the same time and such a pair of images is displayed on the display 82, thereby being able to perform magnification observation while keeping track of the current observation spot.

===Action of Beam Splitter===

An action of the beam splitter in an embodiment of the present invention will be described hereinafter referring to FIGS. 3A, 3B and 4A, 4B as appropriate.

As illustrated in FIG. 1, in the observation apparatus according to an embodiment of the present invention, the magnification observation lens 40 is arranged adjacent to the (face 11c of) the beam splitter 1. Therefore, a distance from the object point of the observation target 9 to the magnification observation lens 40 is D/2+β. The plate thickness (2β) of the plane parallel plates 11 and 12 of the beam splitter 1 is sufficient with a thickness approximately equal to an outer diameter of the magnifying observation lens 40, which results in β≈EP/2 (≈α).

Figure 14:
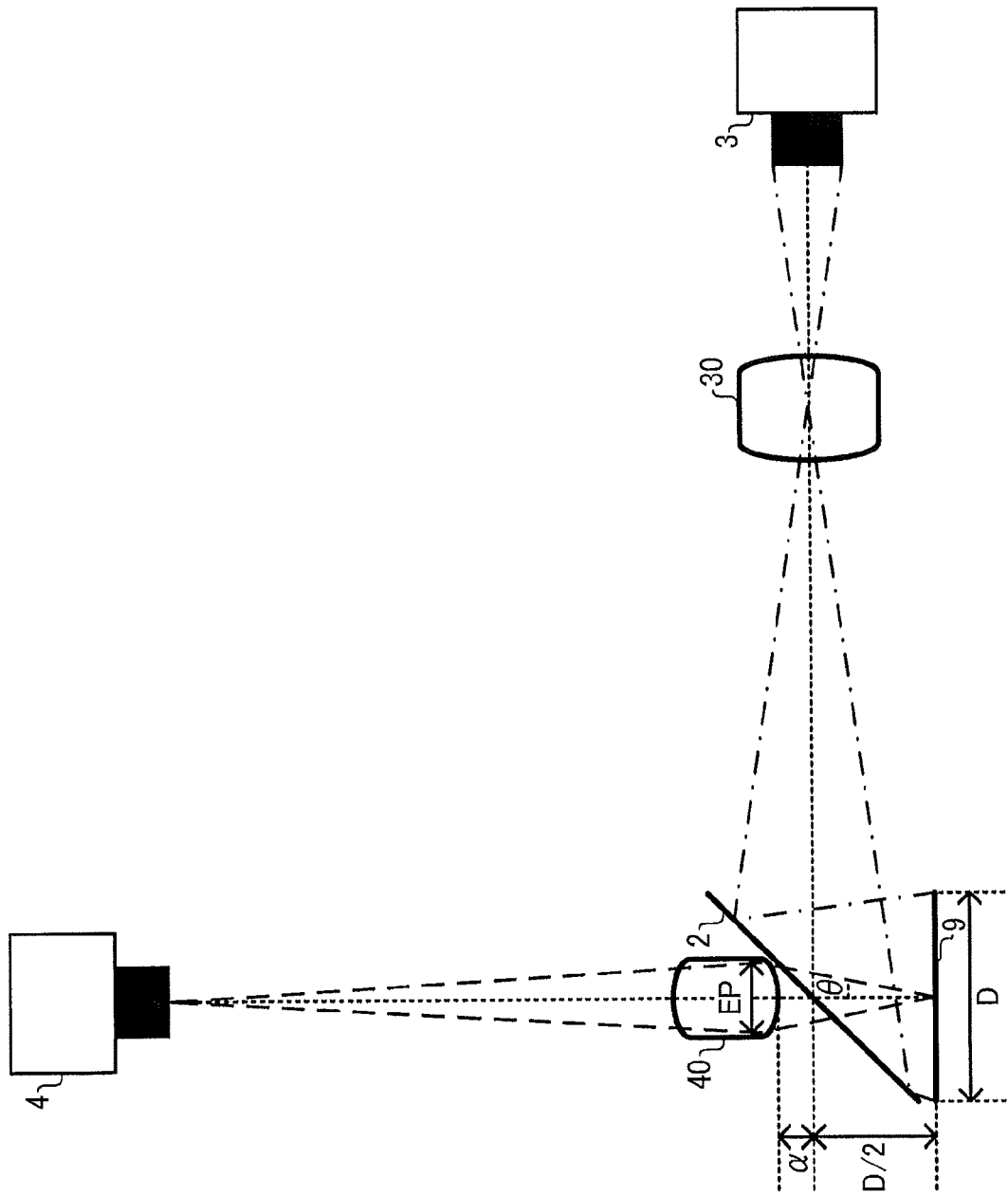
FIG. 14 is a schematic diagram illustrating a configuration of an observation apparatus in which an optical axis of an entire observation optical system and an optical axis of a magnification observation optical system are matched with each other by using a semitransparent mirror.

Therefore, a numerical aperture NA of the magnification observation lens 40 in the observation apparatus according to an embodiment of the present invention using the beam splitter 1 is expressed as follows:

$$NA = n \cdot \sin \theta$$
$$\approx 1.5 \times (EP/2)/(D/2 + \beta)$$
$$\approx 1.5 \times EP/(D + EP)$$

and it is (n=) 1.5 times of the numerical aperture NA of the magnification observation lens 40 in the observation apparatus using the semitransparent mirror 2 illustrated in FIG. 14.

Figure 3A:
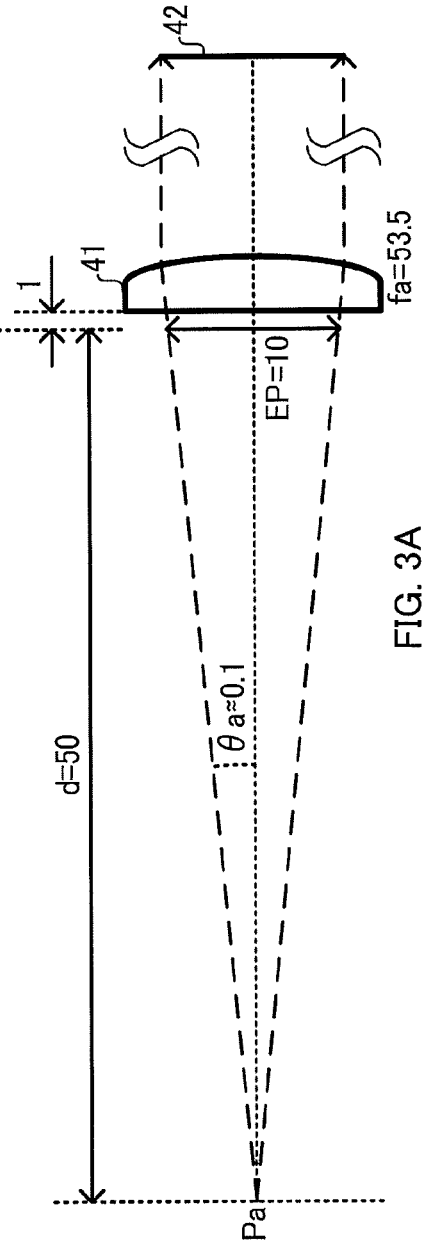
FIG. 3A is a diagram for describing a numerical aperture of a magnification observation lens 40, when a beam splitter 1 is used and a space from an object point to a microscope objective lens is all in air.
Figure 3B:
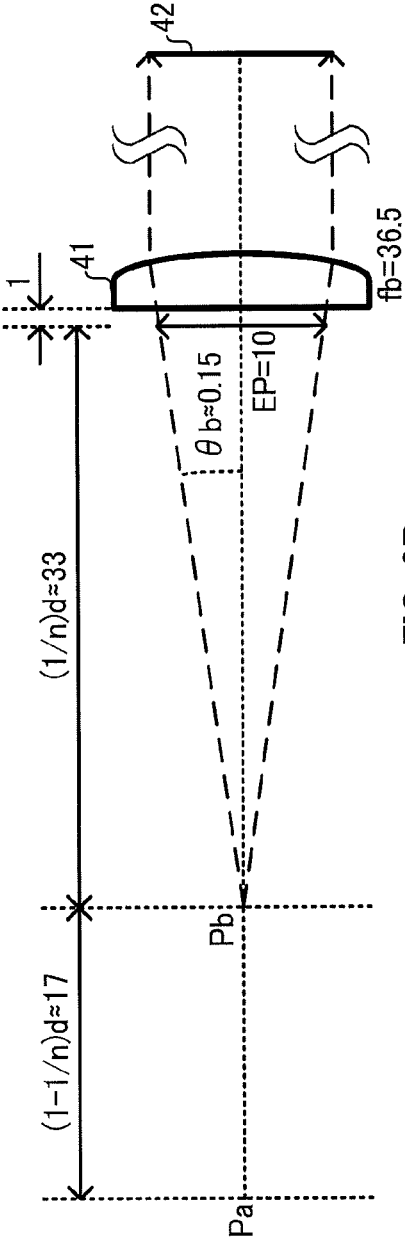
FIG. 3B is a diagram for describing a numerical aperture of a magnification observation lens 40, when a beam splitter 1 is used and a space between an object point and a lens barrel front edge is glass.

Such an action can be described as a shift effect caused by the plane parallel plates made of a material with a high refractive index such as glass as illustrated in FIGS. 3A and 3B. FIGS. 3A and 3B illustrate examples of a positional relationship in the case where the magnification observation lens 40 includes an infinity corrected system objective lens 41 and an image forming lens 42, as a specific configuration of the magnification observation lens 40 which is a microscope objective lens. Further, in FIGS. 3A and 3B, the entrance pupil diameter EP of the infinity corrected system objective lens 41 is set to 10 mm, a distance from the lens to its lens barrel front edge is set to 1 mm, and an operation distance of the lens (a distance d from lens barrel front edge to object point Pa of observation target 9) is set to 50 mm.

As illustrated in FIG. 3A, since a space from the object point to the microscope objective lens is all in the air, the numerical aperture NA of the infinity corrected system objective lens 41 is NA (=n0·sin θa)≈0.1. Further, since a focal distance fa of the infinity corrected system objective lens 41 is approximately equal to the distance to the object point Pa, a lens with fa=53.5 mm, for example, is used.

Whereas, as illustrated in FIG. 3B, in the observation apparatus according to an embodiment of the present invention illustrated in FIG. 1, the plane parallel plate 11 (and 12) made of glass is inserted to the space between the object point and the lens barrel front edge. Thus, the object point of the observation target 9 is apparently located at Pb shifted from Pa by (1−1/n)d≈17 mm.

As such, in the observation apparatus according to an embodiment of the present invention, the object point of the observation target 9 is apparently brought closer to the magnification observation lens 40 (infinity corrected system objective lens 41) by using the beam splitter 1. That is, an image Pb of Pa obtained by being moved by the effect of the glass plane parallel plate is seen by the objective lens.

Thus, even if the entrance pupil diameter EP of the magnification observation lens 40 is equal to that in FIG. 3A, the infinity corrected system objective lens 41 with a shorter focal distance (in this case, fb=36.5 mm, for example) is used since the lens receives a light flux from Pb which is brought closer thereto.

As a result, as an aperture angle becomes larger from θa=0.1 in FIG. 3A to θb=0.15 in FIG. 3B, the numerical aperture NA of the lens can be increased (by n times). Furthermore, the resolution δ of the magnification observation lens 40 is improved (by n times).

Whereas, as illustrated in FIGS. 4A and 4B, if the numerical aperture NA and the focal distance f of the magnification observation lens 40 are the same between FIGS. 4A and 4B, the object point of the observation target 9 can be arranged farther from the lens. In FIGS. 4A and 4B, the focal distance f of the infinity corrected system objective lens 41 is set to 40 mm, and the distance from the lens to the lens barrel front edge is set to 1.3 mm.

As illustrated in FIG. 4A, in the observation apparatus without the beam splitter 1 illustrated in FIG. 14, the operation distance of the infinity corrected system objective lens 41 is equal to a physical distance from the lens barrel front edge to the object point of the observation target 9, which results in (40−1.3=) 38.7 mm. Further, as illustrated in FIG. 4B, for example, in the observation apparatus according to an embodiment of the present invention with the beam splitter 1, the physical distance from the lens barrel front edge to the object point of the observation target 9 can be set to (2+42+10+2.5=) 56.5 mm. In this case, since the dimension in the right-and-left direction of the beam splitter 1 in FIGS. 4A and 4B is (42+42=) 84 mm, it becomes possible to perform entire observation and magnification observation of the observation target 9 in a dish (culture dish) having a diameter of 60 mm or on a microplate having a size of 80 mm×120 mm.

As such, in the observation apparatus according to an embodiment of the present invention, the object point of the observation target 9 can be arranged farther from the magnification observation lens 40 (infinity corrected system objective lens 41) by using the beam splitter 1. Thus, even if the numerical aperture NA and the focal distance f of the magnification observation lens 40 are the same between FIGS. 4A and 4B, the operation distance of the lens can be made longer.

As described above, in FIG. 1, the distance between the observation target 9 and the beam splitter 1 and the distance between the magnification observation lens 40 and the beam splitter 1 are preferably as close to 0 as possible. That is, the space between the magnification observation lens 40 and the observation target 9 is filled as much as possible with glass with a refractive index n (>1) higher than that of air, thereby the numerical aperture NA of the magnification observation lens 40 can take a value closer to the value obtained by the above definition equation NA=n·sin θ. Further, the shift effect by the plane parallel plate made of glass is increased as much as possible, to extend the operation distance of the magnification observation lens 40, thereby being able to perform entire observation and magnification observation of the observation target in the culture vessel of a larger size.

In an actual observation apparatus, in order to prevent a scratch on the face caused by mechanical contact with glass and deterioration in image quality, it is preferable to provide a small gap of approximately several mm between the observation target 9 and the beam splitter 1 and between the magnification observation lens 40 and the beam splitter 1.

===Another Configuration Example of Beam Splitter===

In an embodiment described above, the light splitting section is constituted by the semitransparent mirror 13 with a transmittance and a reflectance of approximately 50% each, but it is not limited thereto. In general, if the light splitting section is set to a transmittance of T % (0<T<100) and a reflectance of (100−T) %, it is only necessary that the light reducing section is set to a transmittance of T %.

As an example, a description will be given of a case where the light splitting section is of a transmittance of 20%. In this case, it is only necessary that the light reducing section is set to a transmittance of 20%, resulting in a reflectance thereof being (100−20) %, that is, 80%. The light splitting section is preferably set to a transmittance of approximately 20%. This is because more of the light from the photographing target is preferably caused to enter a reduction optical system, since a magnified image becomes darker than a reduced image when an image of the photographing target is formed on an imaging face by an optical system in general.

In an embodiment described above, the beam splitter is constituted by the plane parallel plates 11 and 12 each formed in a trapezoidal columnar shape and the semitransparent mirror 13 having the same shape as the shape of the inclined faces of the plane parallel plates 11 and 12 opposed to each other, but it is not limited thereto.

Figure 5A:
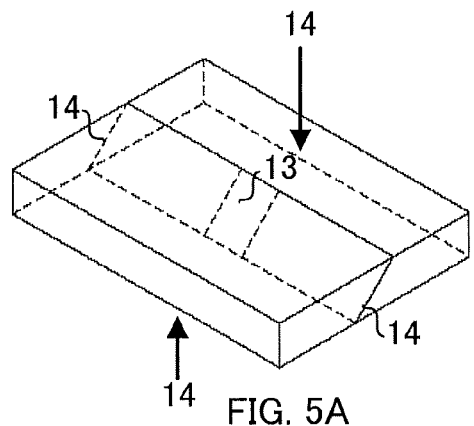
FIG. 5A is a perspective view illustrating another configuration example of a beam splitter.

As illustrated in FIG. 5A, for example, the shape of the semitransparent mirror 13 may be a part of the shape of the inclined faces of the plane parallel plates 11 and 12 opposed to each other. Even in this case, the beam splitter needs to allow approximately 50% of the incident light to pass therethrough that is incident from the lower side (or the upper side) in FIGS. 2 and 5A to 5E in general. Therefore, the light reducing film 14 needs to be attached onto areas on the faces of the plane parallel plates 11 and 12, through which neither the incident light incident onto the semitransparent mirror 13 from the lower side nor the transmitted light from the semitransparent mirror 13 to the upper side in FIGS. 2 and 5A to 5E pass. That is, the light reducing film 14 needs to be attached onto the inclined face continuing to the (reflective face of) the semitransparent mirror 13 in addition to the face 11b and the face 12a in FIG. 2 as well.

The light reducing section has been described as the light reducing film 14, but it is not limited thereto. The light reducing section can be also realized by coating the face, which is to be attached with the light reducing film 14, with an optical thin film made of metal or dielectric. As an example of the optical thin film, $PbF_2$ (lead fluoride (II)) may be cited. The method of coating with the optical thin film enables the light splitting section and the light reducing section to have closer values in transmittance with higher accuracy.

Figure 5B:
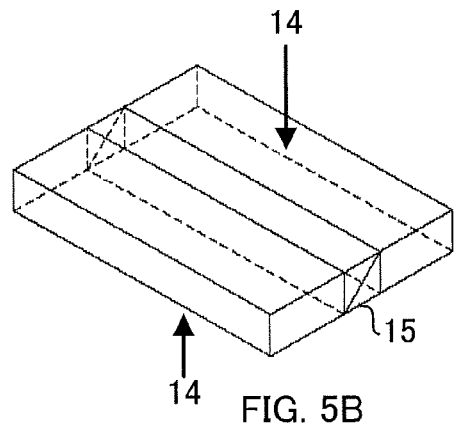
FIG. 5B is a perspective view illustrating another configuration example of a beam splitter.

Further, as illustrated in FIG. 5B, for example, the beam splitter may be configured with the plane parallel plates 11 and 12 each having a rectangular parallelepiped shape and a rectangular column-shaped beam splitter 15 arranged therebetween. Although this beam splitter has substantially the same structure as that of the beam splitter in FIG. 2, the manufacture thereof is relatively easy.

Figure 5C:
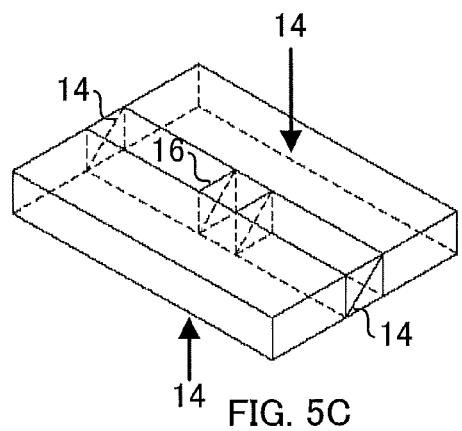
FIG. 5C is a perspective view illustrating another configuration example of a beam splitter.

As illustrated in FIG. 5C, for example, the beam splitter may be configured using a cube-shaped beam splitter 16 which is easily available. This beam splitter has substantially the same structure as the beam splitter in FIG. 5A.

Figure 5D:
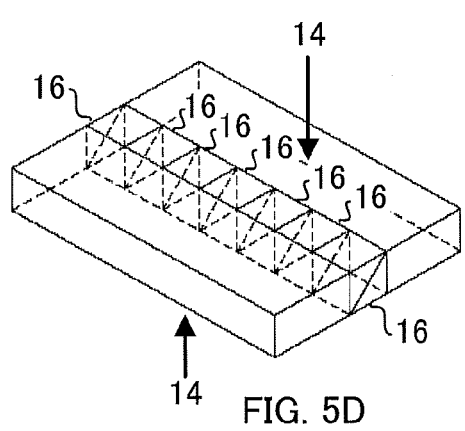
FIG. 5D is a perspective view illustrating another configuration example of a beam splitter.

Further, as illustrated in FIG. 5D, for example, the beam splitter may be configured using a plurality of the cube-type beam splitters 16 which are easily available. This beam splitter has substantially the same structure as those of the beam splitters in FIGS. 2 and 5B, and the manufacture thereof is relatively easy.

Figure 5E:
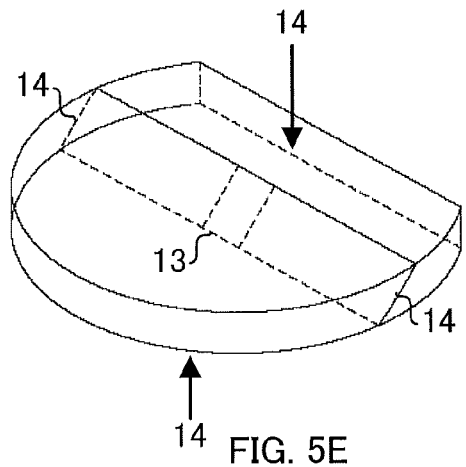
FIG. 5E is a perspective view illustrating another configuration example of a beam splitter.

Further, as illustrated in FIG. 5E, for example, the beam splitter does not have to be in a rectangular parallelepiped shape as a whole.

It is only necessary that the material for the beam splitter is a substance with a refractive index higher than that of air and having light permeability. For example, glass (refractive index equal to or greater than 1.40 and equal to or smaller than 1.84), acrylic resin (refractive index equal to or greater than 1.49 and equal to or smaller than 1.53), for example, e.g., polycarbonate (refractive index of 1.59) may be used as the material for the beam splitter.

===Specific Example of Configurations of Beam Splitter, Entire Observation Optical System, and Magnification Observation Optical System===

Figure 6:
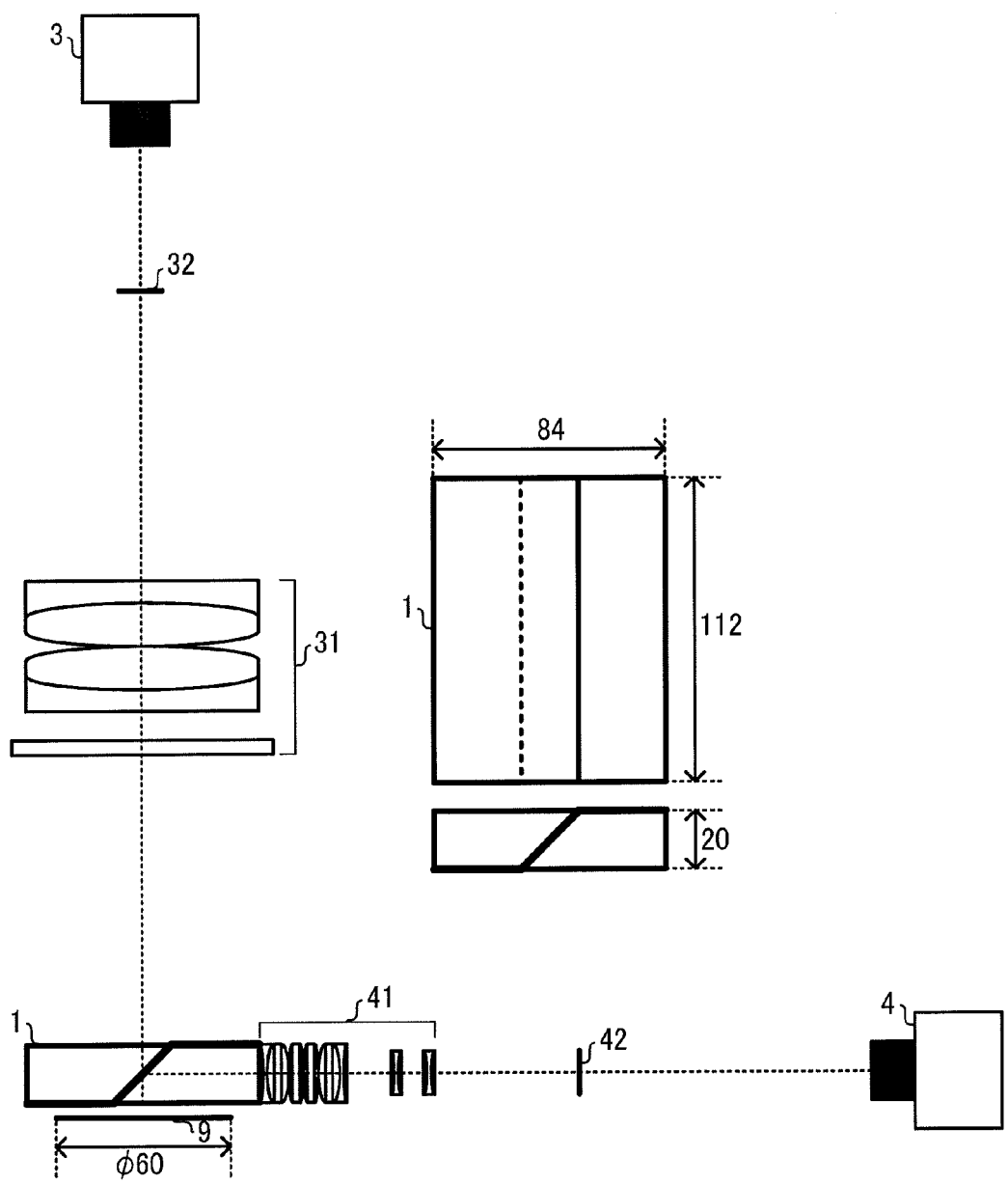
FIG. 6 is a diagram illustrating an example of a specific configuration of a beam splitter, an entire observation optical system, and a magnification observation optical system.

Here, an example of specific configurations of the beam splitter, the entire observation optical system, and the magnification observation optical system is illustrated in FIG. 6. In FIG. 6, it is assumed that the entire observation and the magnification observation are performed with respect to the observation target 9 in a dish having a diameter of 60 mm.

In FIG. 6, the beam splitter 1 has the same structure as that of the beam splitter 1 illustrated in FIG. 2, and the plane parallel plate has a plate thickness of 20 mm. Further, the parallel face has a length (dimension of a side in parallel with the inclined face) of 112 mm and a width of 84 mm. The horizontal to vertical ratio of the parallel face is 4:3 in compliant with an aspect ratio of the entire observation camera 3 (and the magnification observation camera 4) such as a CCD camera.

The entire observation optical system includes the entire observation camera 3, a telecentric correcting lens 31, and an image forming lens 32, and has an image forming magnification of 0.5 times, for example. Further, the magnification observation optical system includes the magnification observation camera 4, the infinity corrected system objective lens 41, and the image forming lens 42, and has an image forming magnification of 5 times, for example. The focal distance and the operation distance (in the air) of the infinity corrected system objective lens 41 are 40 mm and 38.7 mm, respectively, for example, and the focal distance of the image forming lens 42 is 200 mm, for example.

The optical system arrangement in FIG. 6 is an example in which the optical systems are made coaxial by using the beam splitter according to an embodiment of the present invention specifically on the basis of lens data of the literature disclosed below.

Entire observation optical system: "Camera Lens", Gregory Hallock Smith, SPIE Press, the optical system obtained by tripling in scale the telecentric photographing system (photographing range of Φ20 mm) on the object side on p. 236.

Magnifying observation optical system: Japanese Unexamined Patent Application Publication No. 4-26813, the optical system in which an image forming lens with a focal distance of 200 mm is used for objective lens data in the embodiment 5.

===Configuration Example 1 of Observation Apparatus===

Figure 7:
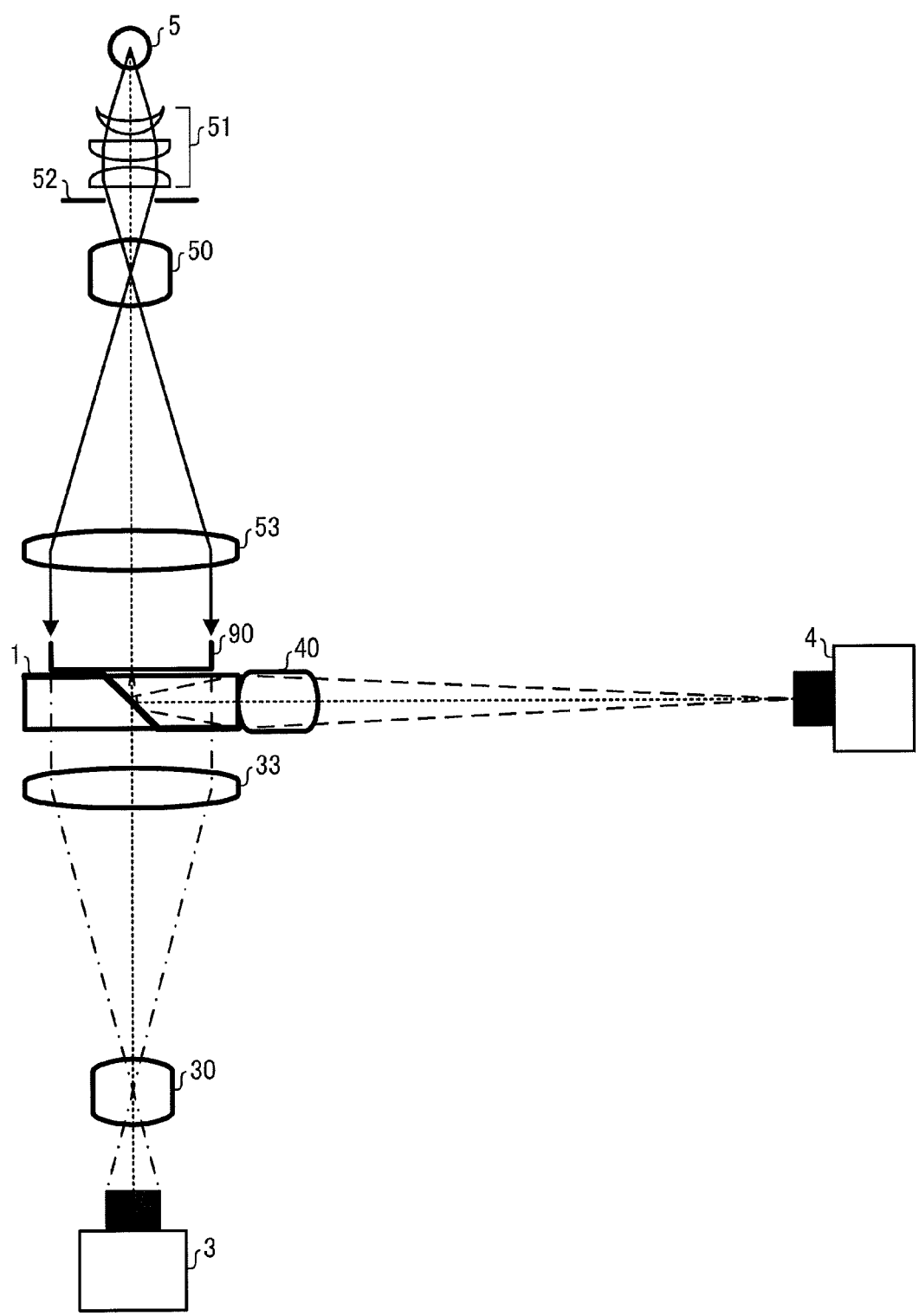
FIG. 7 is a diagram illustrating an example of a configuration of an observation apparatus provided with an illumination optical system common to the optical systems.

FIG. 7 illustrates here an example of a configuration of an observation apparatus including an illumination optical system common to the optical systems. In FIG. 7, it is assumed that the entire observation and the magnification observation are performed for the observation target 9 in the culture vessel 90 such as a dish. Further, for example, e.g., a computer for controlling cameras and processing an image picked up by cameras are omitted.

The observation apparatus illustrated in FIG. 7 includes the beam splitter 1, the entire observation optical system, the magnification observation optical system, and an illumination optical system common thereto.

The beam splitter 1 is arranged below the culture vessel 90. Thus, the beam splitter 1 is arranged upside-down with respect to the arrangement in FIG. 1 such that the lower side thereof in FIG. 2 (faces 11a and 12a side) is opposed to the culture vessel 90.

The entire observation optical system is arranged below the culture vessel 90 and the beam splitter 1, and a telecentric field lens 33 is added to the entire observation optical system of the observation apparatus illustrated in FIG. 1, in order to take in a light beam in the vertical direction in the whole area of the culture vessel 90. Further, the magnification observation optical system has a configuration similar to that of the magnification observation optical system of the observation apparatus illustrated in FIG. 1.

The illumination optical system includes an entire/magnification observation illumination light source 5, an entire illumination lens 50, a condenser lens 51, a field stop 52, and a telecentric field lens 53.

As the entire/magnification observation illumination light source 5, for example, e.g., a halogen lamp and a white LED are used, and light from the entire/magnification observation illumination light source 5 is condensed by the condenser lens 51. Further, the condensed light is masked by the field stop 52 into a desired shape, and enlarged to be projected by the entire illumination lens 50. Then, the culture vessel 90 is illuminated by the telecentric field lens 53 from the vertical direction in the whole area.

With such a configuration, the observation apparatus can simultaneously perform the entire observation and the magnification observation with respect to the observation target in the culture vessel 90 in bright field illumination by using the entire/magnification observation illumination light source 5. Therefore, the observation apparatus can be used for observation of cells or a colony of living organism having light permeability, and the observation apparatus is suitable particularly for observation of dyed cells. For example, with respect to the cells dyed by the fluorescent reagent, by setting the wavelength of the entire/magnification observation illumination light source 5 to an excitation wavelength of a fluorescent reagent, a fluorescence image and a fluorescence microscopic image of the entire culture vessel 90 can be picked up simultaneously. In this case, an optical band-pass filter, configured to allow only a wavelength of fluorescent emission to pass therethrough by shutting out the excitation light, needs to be provided on each of the respective optical axes between the lenses of the observation optical systems and the cameras.

===Configuration Example 2 of Observation Apparatus===

Figure 8:
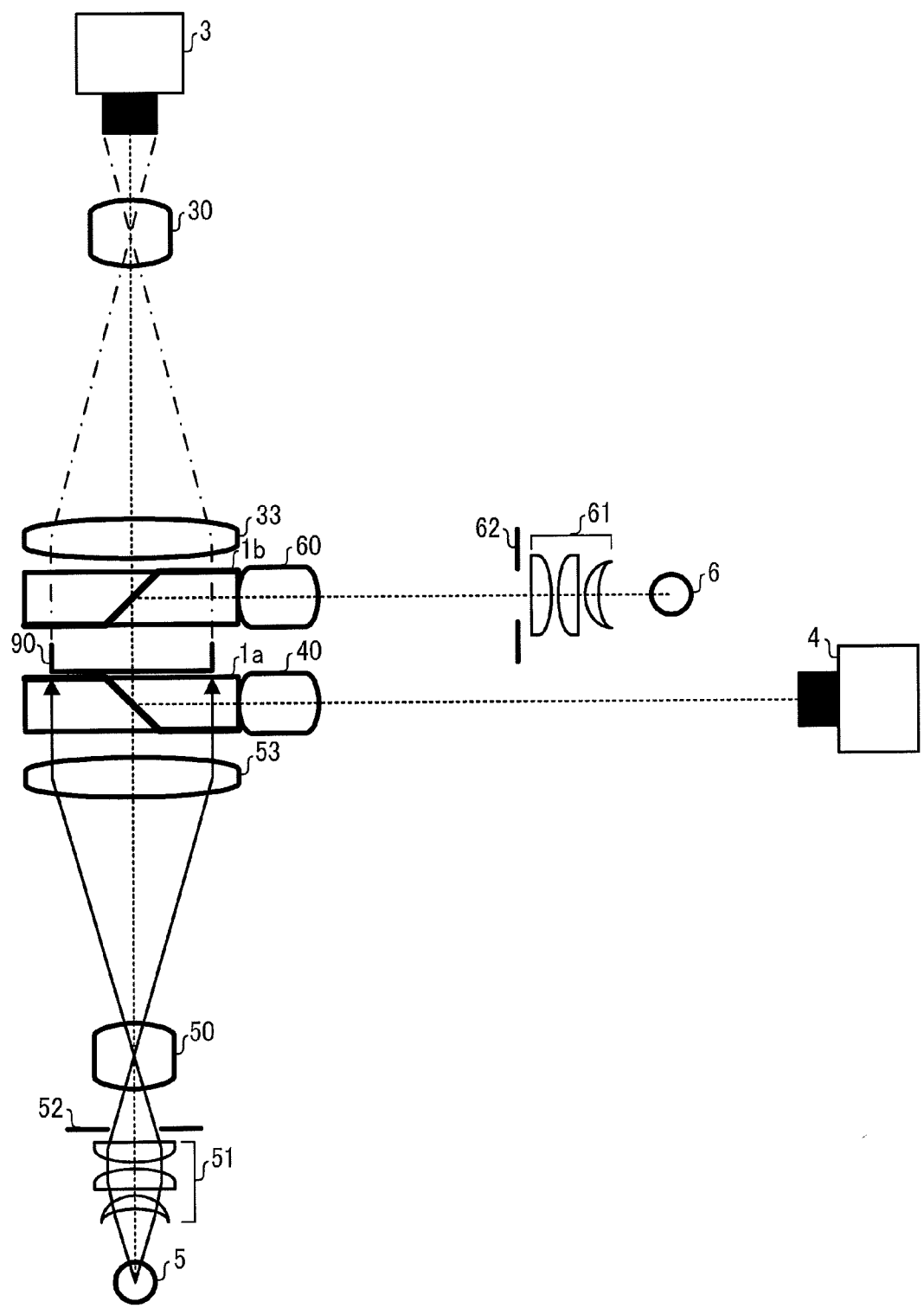
FIG. 8 is a diagram for explaining a method of carrying out entire observation with bright-field illumination in an observation apparatus provided with two illumination optical systems.
Figure 9:
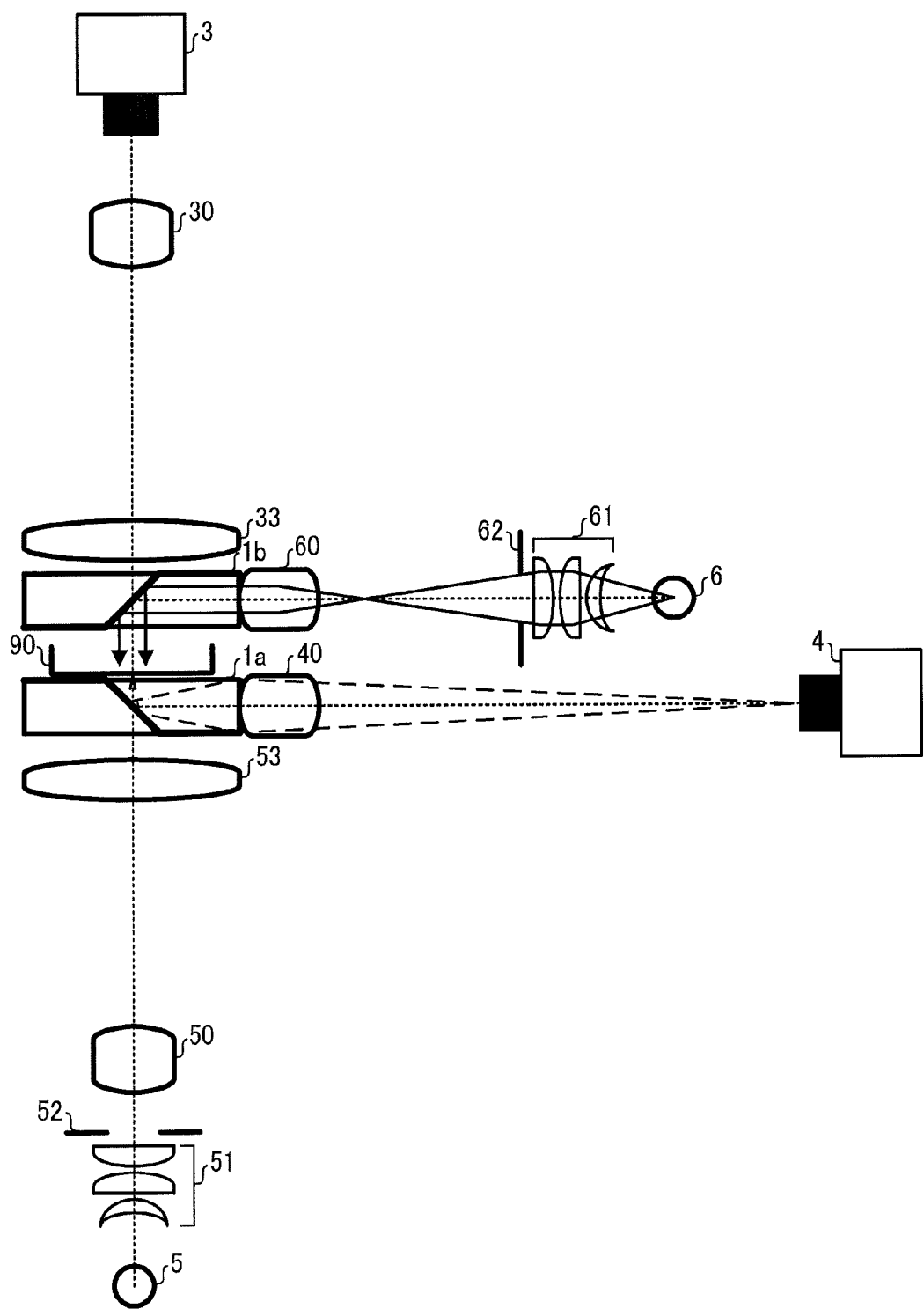
FIG. 9 is a diagram for explaining a method of carrying out magnification observation with bright-field illumination in the observation apparatus provided with two illumination optical systems.
Figure 10:
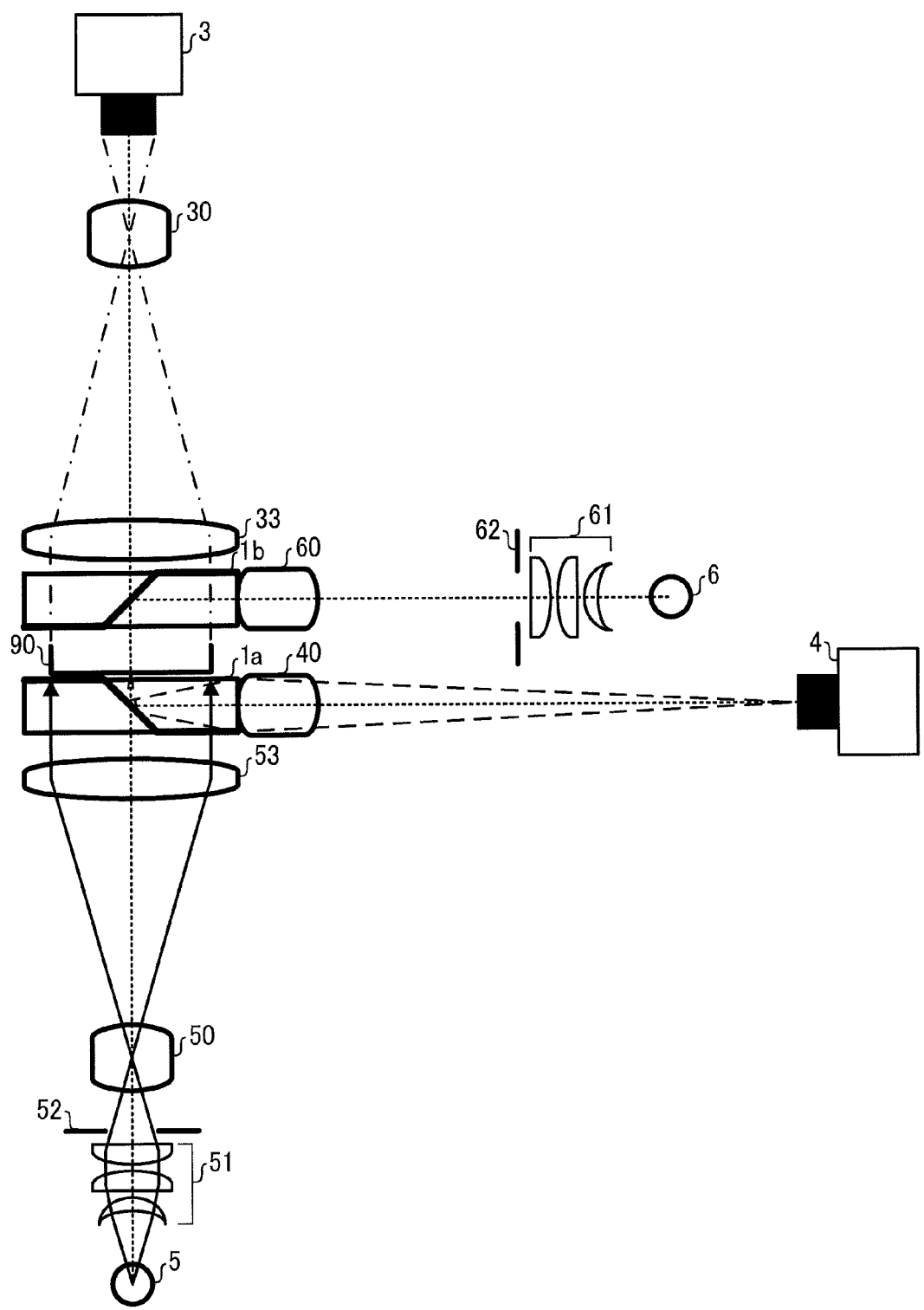
FIG. 10 is a diagram for explaining a method of carrying out entire observation with bright-field illumination and of carrying out magnification observation with dark-field illumination in the observation apparatus provided with two illumination optical systems.

FIGS. 8 to 10 illustrate here an example of a configuration of an observation apparatus including two illumination optical systems. In FIGS. 8 to 10, it is also assumed that the entire observation and the magnification observation are performed for the observation target 9 in the culture vessel 90, and for example, e.g., a computer is omitted.

The observation apparatus illustrated in FIGS. 8 to 10 includes two beam splitters 1a and 1b, the entire observation optical system, the magnification observation optical system, and two illumination optical systems.

The (first) beam splitter 1a and the (second) beam splitter 1b are arranged so as to be opposed to each other with the lower sides (faces 11a and 12a side) thereof in FIG. 2. The culture vessel 90 is arranged between the faces 11a and 12a. Further, the beam splitter 1a is arranged similarly to the beam splitter 1 of the observation apparatus illustrated in FIG. 7, while the beam splitter 1b is arranged similarly to the beam splitter 1 of the observation apparatus illustrated in FIG. 1.

The entire observation optical system has a configuration similar to that of the entire observation optical system of the observation apparatus illustrated in FIG. 7, except that it is arranged above the culture vessel 90 and the beam splitter 1b. Further, the magnification observation optical system has a configuration similar to that of the magnification observation optical system of the observation apparatus illustrated in FIGS. 1 and 7.

The first illumination optical system including the entire/magnification observation illumination light source 5 (first illumination light source) has a configuration similar to that of the illumination optical system of the observation apparatus illustrated in FIG. 7, except that it is arranged below the culture vessel 90 and the beam splitter 1a. Further, the second illumination optical system includes a magnification observation illumination light source 6 (second illumination light source), a microscope illumination lens 60, a condenser lens 61, and a field stop 62.

With such a configuration, the observation apparatus can perform the entire observation with respect to the observation target in the culture vessel 90 in bright field illumination by turning on the entire/magnification observation illumination light source 5 as illustrated in FIG. 8. At such a time, the magnification observation illumination light source 6 and the camera 4 are not operated. Further, the magnification observation can be performed with respect to the observation target in the culture vessel 90 in bright field illumination by turning on the magnification observation illumination light source 6 as illustrated in FIG. 9. At such a time, the entire observation illumination light source 5 and the camera 3 are not operated. Then, in synchronization with frame rates of the entire observation camera 3 and the magnification observation camera 4, the lighting states in FIGS. 8 and 9 are alternately switched and images are picked up by the cameras respectively, so that a pair of images substantially simultaneously picked up can be displayed on for example, e.g., a display.

The observation apparatus can be used also for the observation of cells and a colony of living organisms having light permeability, similarly to the observation apparatus illustrated in FIG. 7. Particularly, since the observation apparatus is provided with illumination exclusively for the magnification observation optical system, a ring slit illumination is used for the magnification observation illumination light source 6 and an objective lens for living organisms having a phase strip is used for the magnification observation lens 40, thereby being able to pick up a phase contrast microscopic image as well. Further, since the two illumination optical systems are independent of each other, it becomes possible to pick up images with light beams having different wavelengths, respectively, and LEDs in a plurality of colors such as for example, e.g., blue and green are used for a light source or a white light source and an optical band-pass filter are used in combination, thereby being able to set the illumination wavelengths, respectively.

For example, with respect to a cell dyed with a fluorescent reagent, the entire observation is performed with white visible light and characters written on the face of the culture vessel 90 are photographed, thereby being able to prevent mix-up of culture vessels. Whereas, the magnification observation can be performed with illumination having an excitation wavelength of the fluorescent reagent. In this case, an optical filter, configured to allow only the wavelength of fluorescent emission to pass therethrough, needs to be provided on the optical axis between the magnification observation lens 40 and the magnification observation camera 4.

Further, as illustrated in FIG. 10, the entire/magnification observation illumination light source 5 is turned on, thereby being able to perform, with respect to the observation target in the culture, the entire observation vessel 90 in bright field illumination and simultaneously the magnification observation in dark field illumination. Thus, for example, with respect to the cell dyed with a fluorescent reagent, a bright field illumination (entire) image and a phase contrast microscopic image in the same area can be picked up and displayed substantially simultaneously. Further, since the magnification observation can be performed by using a different illumination light source, a bright field illumination microscopic image and a phase contrast microscopic image of the same area can be picked up, for example.

Therefore, the lighting states in FIGS. 9 and 10 are alternately switched in an alternate manner in synchronization with the frame rates of the entire observation camera 3 and the magnification observation camera 4, and images are picked up by the cameras, respectively, thereby being able to display one entire image and two types of microscopic images picked up substantially simultaneously on for example, e.g., a display.

For example, by using a ring slit illumination for the magnification observation illumination light source 6 and by using an objective lens for living organisms having a phase strip for the magnification observation lens 40 in FIG. 9, phase contrast microscopic images can be picked up. Further, for example, in FIG. 10, by setting the wavelength of the entire/magnification observation illumination light source 5 to an excitation wavelength of the fluorescent reagent, a fluorescence image and a fluorescent microscopic image of the entire culture vessel 90 can be picked up. As a result, one entire image and two types of microscopic images using different illumination light sources can be picked up and displayed substantially simultaneously. In this case, an optical filter configured to allow only the wavelength of fluorescent emission to pass therethrough needs to be provided all the time on the optical axis between the magnification observation lens 40 and the magnification observation camera 4, and the wavelength of the magnification observation illumination light source 6 needs to be set to a wavelength of the fluorescent emission and not to the excitation wavelength of the fluorescent reagent.

===Configuration Example 3 of Observation Apparatus===

Figure 11:
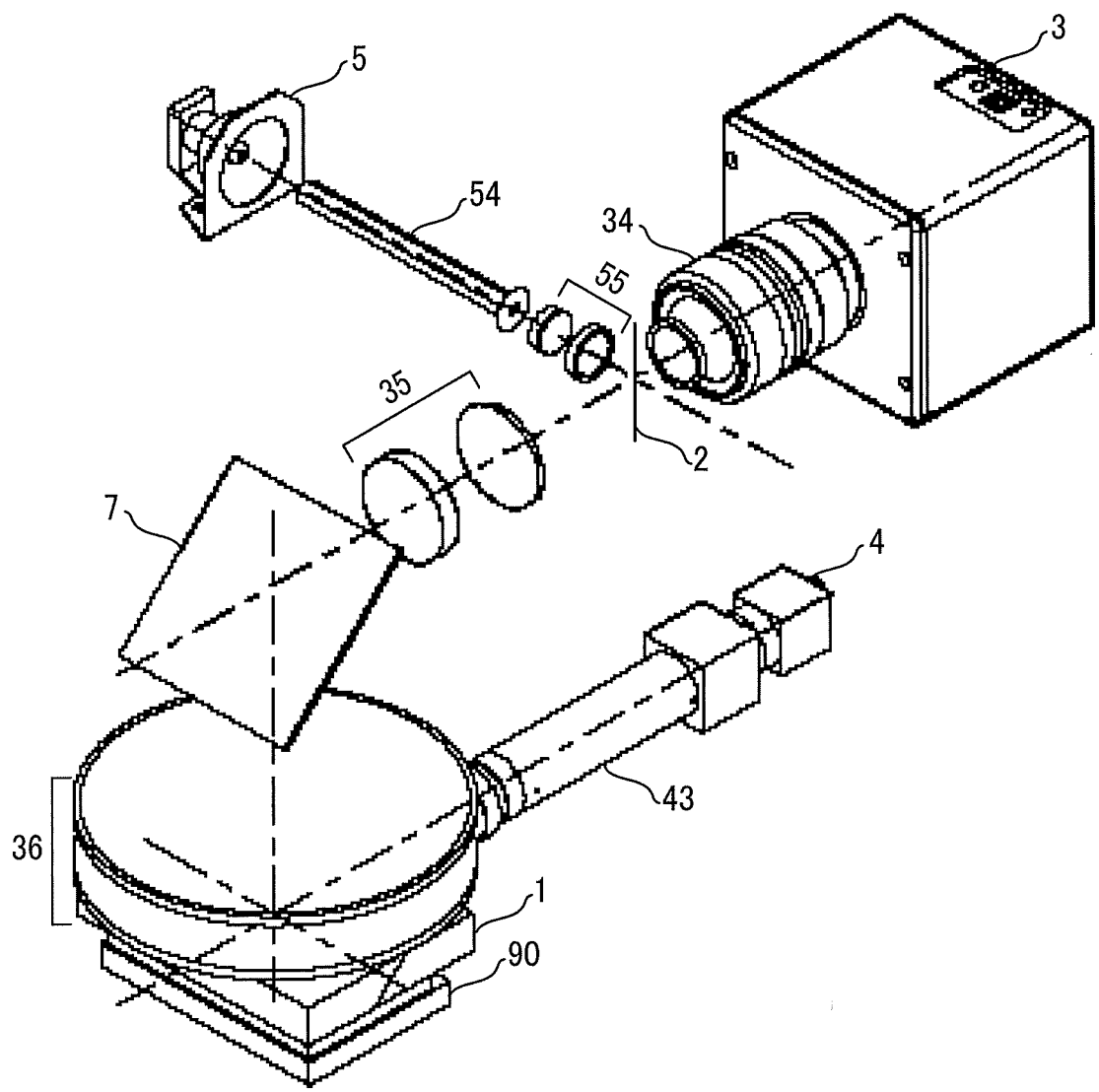
FIG. 11 is a perspective view illustrating an example of a configuration of an observation apparatus provided with coaxial epi-illumination from above an observation target.
Figure 12:
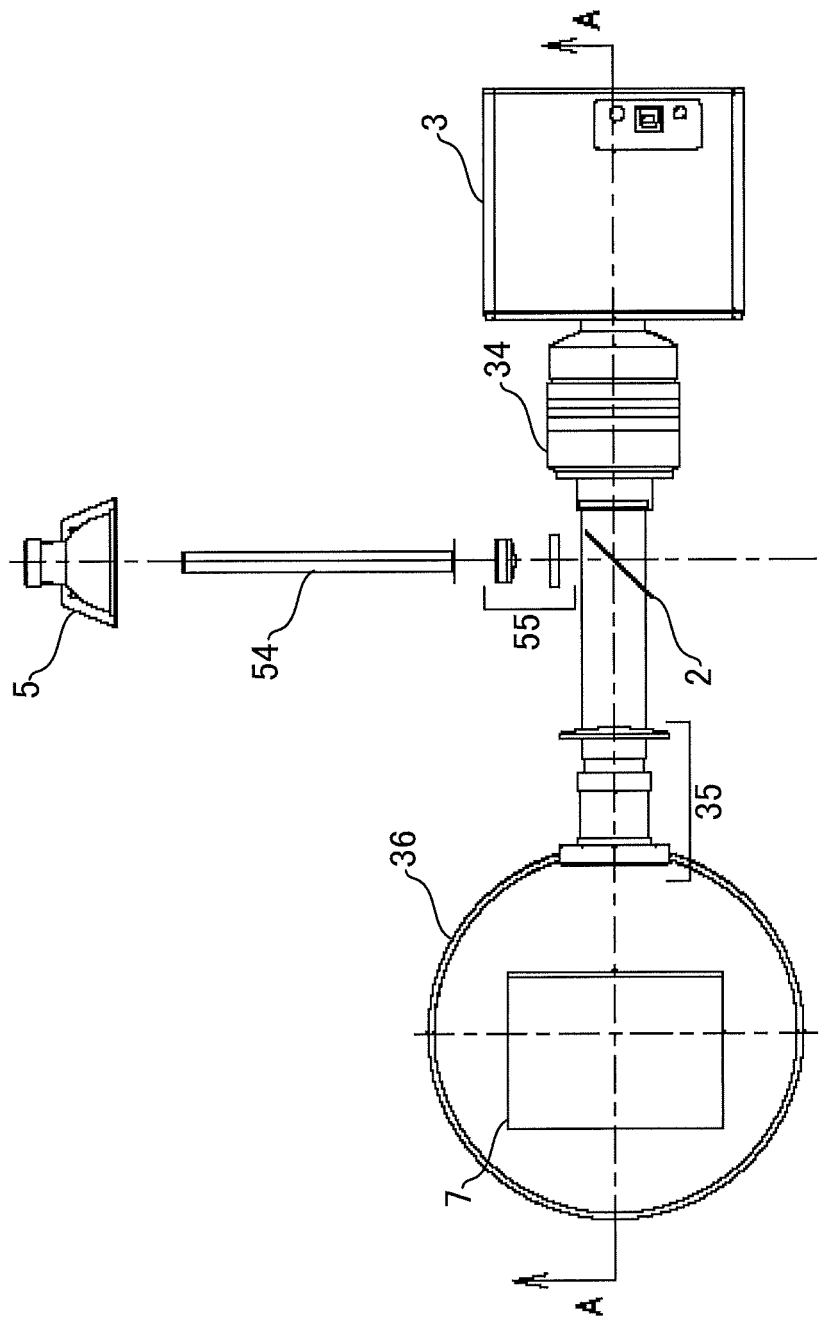
FIG. 12 is a plan view of the observation apparatus illustrated in FIG. 11 when seen from above the observation target.
Figure 13:
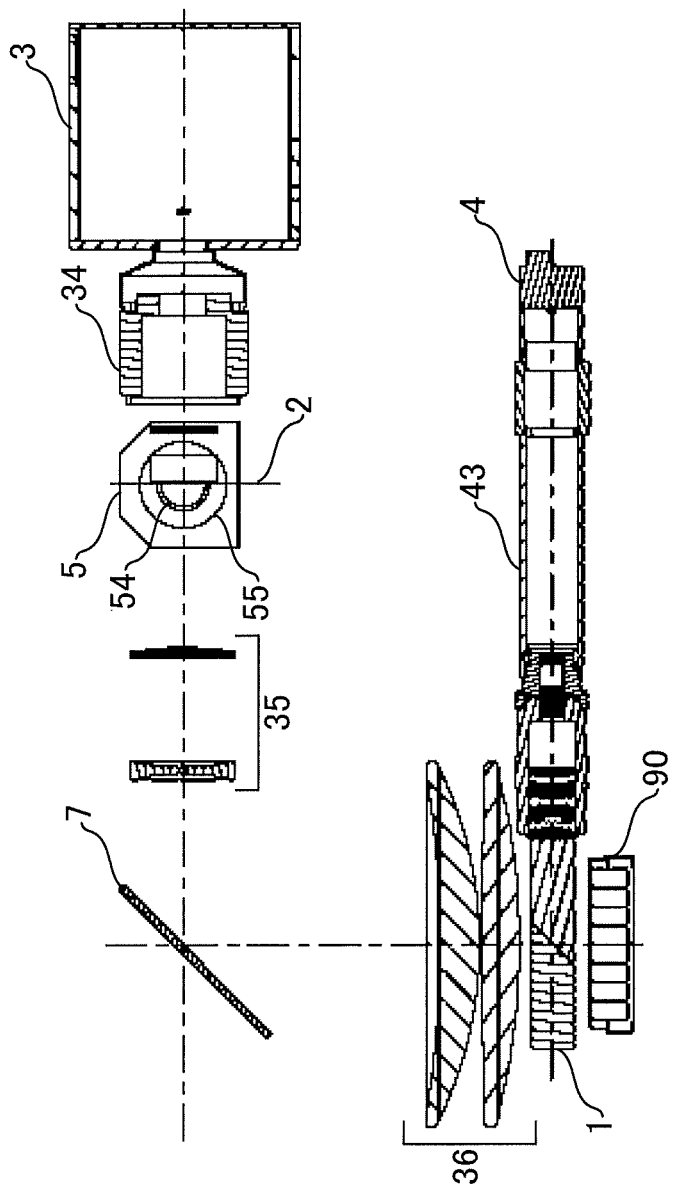
FIG. 13 is a perpendicular sectional view of the observation apparatus illustrated in FIG. 11 cut along line A-A in FIG. 12.

FIGS. 11 to 13 illustrate here an example of a configuration of an observation apparatus including coaxial epi-illumination from above an observation target. In FIGS. 11 to 13, it is also assumed that the entire observation and the magnification observation are performed for the observation target 9 in the culture vessel 90, and for example, e.g., a computer is omitted. FIG. 11 is a perspective view illustrating the entire optical system included in the observation apparatus, FIG. 12 is a plan view when viewed from above the observation target, and FIG. 13 is a vertical sectional view obtained by being cut along the line A-A in FIG. 12

The observation apparatus illustrated in FIGS. 11 to 13 includes the beam splitter 1, the entire observation optical system, the magnification observation optical system, and a coaxial epi-illumination optical system common thereto. Further, the beam splitter 1 is arranged above the culture vessel 90, and is arranged similarly to the beam splitter 1 of the observation apparatus illustrated in FIG. 1.

The entire observation optical system is arranged above the culture vessel 90 and the beam splitter 1, and includes the entire observation camera 3, a master lens 34, the semitransparent mirror 2, an entire observation objective lens group 35, a reflection mirror 7, and an entire observation objective lens group 36. Further, the master lens 34 is attached to the entire observation camera 3. The entire observation objective lens group 35 is arranged between the semitransparent mirror 2 and the reflection mirror 7, the entire observation objective lens group 36 (field lens) is arranged in the vicinity of and above the beam splitter 1, and the lens group constitutes an object-side telecentric system.

The magnification observation optical system includes the magnification observation camera 4 and a microscope 43. Further, the magnification observation camera 4 is attached to the microscope 43. Similarly to the magnification observation optical system of the observation apparatus illustrated in FIGS. 1, 7, and 8 to 10, an objective lens of the microscope 43 is arranged in such a manner as to be adjacent to (the face 11c of) the beam splitter 1.

The coaxial epi-illumination optical system is arranged above the culture vessel 90 and the beam splitter 1, and includes the entire/magnification observation illumination light source 5, a light pipe 54, an illumination lens 55, the semitransparent mirror 2, the entire observation objective lens group 35, the reflection mirror 7, and the entire observation objective lens group 36. The semitransparent mirror 2, the entire observation objective lens group 35, the reflection mirror 7, and the entire observation objective lens group 36 are used in common with the entire observation optical system. The optical axis of the illumination optical system matches the optical axis of the entire observation optical system between the semitransparent mirror 2 and the culture vessel 90.

With such a configuration, the observation apparatus can perform the entire observation and the magnification observation at the same time with respect to the observation target in the culture vessel 90 in coaxial epi-illumination from thereabove by using the entire/magnification observation illumination light source 5. Therefore, it is particularly suitable for observation of an opaque sample which does not allow light to pass therethrough, and ordinary entire observation and magnification observation can be performed at the same time in white illumination, for example.

In the observation apparatus, by using a fluorescent filter cube (filter cassette) used in general in a fluorescent microscope in place of the semitransparent mirror 2, a fluorescence image of the entire culture vessel 90 can be picked up. Further, by providing a fluorescent filter in a lens barrel of the microscope 43, a fluorescent microscopic image can be also picked up.

As described above, in the beam splitter 1, the plane parallel plates 11 and 12 with a refractive index higher than air and the light splitting section (the semitransparent mirror 13, the rectangular column-shaped beam splitter 15, a cube-type beam splitter 16) are arranged so that T % of incident light incident from the lower side in FIG. 2 is allowed to pass therethrough to the upper side and (100−T) % thereof is reflected toward the 11c face direction, and a light reducing section with transmittance of T % is provided in areas in the plane parallel plates 11 and 12, through which neither the incident light incident onto the light splitting section from the lower side nor the transmitted light from the light splitting section to the upper side do not pass, so that the entire observation and the magnification observation can be performed at the same time without reduction in numerical aperture or use of a lens with a longer operation distance.

Then, in the observation apparatus illustrated in FIG. 1, the lower side of the beam splitter 1 in FIG. 2 is opposed to the observation target 9 and such an arrangement is made that the transmitted light passed through the semitransparent mirror 13 and the transmitted light passed through the light reducing film 14 are guided to the entire observation optical system, and that the reflected light reflected by the semitransparent mirror 13 is guided to the magnification observation optical system. Thus, the optical axis of the entire observation optical system and the optical axis of the magnification observation optical system can be matched with each other between the observation target 9 and the semitransparent mirror 13 of the beam splitter 1, thereby being able to perform the magnification observation while keeping track of the current observation spot.

Further, in the observation apparatus illustrated in FIGS. 8 to 10, such an arrangement is made that the lower sides of the beam splitters 1a and 1b in FIG. 2 are opposed to each other, the observation target is located between the beam splitters 1a and 1b, the transmitted light and the reflected light are respectively guided to the entire observation optical system and the magnification observation optical system using the beam splitter 1a, and the light from the entire/magnification observation illumination light source 5 and the magnification observation illumination light source 6 are guided to the observation target using the beam splitter 1b, thereby being able to perform the entire observation and the magnification observation for the observation target switching therebetween in bright field illumination, or perform the entire observation therefor in bright field illumination and simultaneously perform the magnification observation therefor in dark field illumination.

Further, the light reducing film 14 with the transmittance of T % is attached onto the face continuing to the reflective face of the light splitting section in the faces of the plane parallel plates 11 and 12, thereby being able to cause the beam splitter 1 to allow T % of the incident light incident from the lower side (or the upper side) in FIG. 2 to pass therethrough, as a whole, thereby being able to perform the entire observation in uniform brightness. If brightness uniformity is not required in the entire observation, the light reducing film does not have to be used.

Further, by configuring the light splitting section by the semitransparent mirror 13 with a transmittance and a reflectance of approximately 50% each, the entire observation and the magnification observation can be performed at the same time in equal brightness.

Further, the plane parallel plates 11 and 12 are made of glass with a refractive index equal to or greater than 1.5, thereby being able to increase the numerical aperture NA of the magnification observation lens 40 by 1.5 times or more, make a focus of the lens shorter, and further, improve resolution δ of the lens.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An observation apparatus comprising:
a beam splitter including
a first plane parallel plate, having first and second faces parallel to each other, with a refractive index higher than a refractive index of air,
a second plane parallel plate, having third and fourth faces arranged to be on the same level as the first and the second faces, respectively, with a refractive index equal to a refractive index of the first plane parallel plate, and
a light splitting section arranged between the first and the second plane parallel plates, the light splitting section configured to allow T % (0<T<100) of incident light incident from a first-and-third-face side to pass therethrough to a second-and-fourth-face side, as well as reflect (100−T) % of the incident light incident from the first-and-third-face side to a direction in parallel with the first to the fourth faces;
a first observation optical system configured to observe an entire observation target; and
a second observation optical system configured to magnify and observe a part of the observation target,
the first and the second plane parallel plates each provided with a light reducing section in an area thereof through which neither the incident light incident from the first-and-third-face side onto the light splitting section nor transmitted light from the light splitting section to the second-and-fourth-face side pass, the light reducing section configured to allow T % of the incident light incident from the first-and-third-face side to pass therethrough to the second-and-fourth-face side,
the beam splitter arranged so that the first and the third faces are opposed to the observation target; the transmitted light passed through the light splitting section and the transmitted light passed through the light reducing section are guided to the first observation optical system;

and reflected light reflected by the light splitting section is guided to the second observation optical system.

2. The observation apparatus according to claim 1, wherein the light reducing section is configured with a light reducing film having a transmittance of T %, the light reducing film attached to faces of the first and the second plane parallel plates continuing to a reflective face of the light splitting section.

3. The observation apparatus according to claim 1, wherein the T has a numerical value of 50.

4. The observation apparatus according to claim 2, wherein the T has a numerical value of 50.

5. The observation apparatus according to claim 1, wherein the first and the second plane parallel plates are made of a light transmissive material with a refractive index equal to or more than 1.4.

6. The observation apparatus according to claim 2, wherein the first and the second plane parallel plates are made of a light transmissive material with a refractive index equal to or more than 1.4.

7. The observation apparatus according to claim 3, wherein the first and the second plane parallel plates are made of a light transmissive material with a refractive index equal to or more than 1.4.

8. The observation apparatus according to claim 4, wherein the first and the second plane parallel plates are made of a light transmissive material with a refractive index equal to or more than 1.4.

9. An observation apparatus comprising:
first and second beam splitters each including
  a first plane parallel plate, having first and second faces parallel to each other, with a refractive index higher than a refractive index of air,
  a second plane parallel plate, having third and fourth faces arranged to be on the same level as the first and the second faces, respectively, with a refractive index equal to a refractive index of the first plane parallel plate, and
  a light splitting section arranged between the first and the second plane parallel plates, the light splitting section configured to allow T % (0<T<100) of incident light incident from a first-and-third-face side to pass therethrough to a second-and-fourth-face side, as well as reflect (100−T) % of the incident light incident from the first-and-third-face side to a direction in parallel with the first to the fourth faces;
a first observation optical system configured to observe an entire observation target;
a second observation optical system configured to magnify and observe a part of the observation target;
a first illumination optical system configured to illuminate the observation target using light from a first illumination light source; and
a second illumination optical system configured to illuminate the observation target using light from a second illumination light source, the first and the second plane parallel plates each provided with a light reducing section in an area thereof through which neither the incident light incident from the first-and-third-face side onto the light splitting section nor transmitted light from the light splitting section to the second-and-fourth-face side pass, the light reducing section configured to allow T % of the incident light incident from the first-and-third-face side to pass therethrough to the second-and-fourth-face side, and the first and second beam splitters are arranged such that the first and the third faces of the first beam splitter are opposed to the first and the third faces of the second beam splitter, the observation target being located between the first and the third faces of the first beam splitter and the first and the third faces of the second beam splitter;

the first beam splitter is arranged so that the transmitted light passed through the light splitting section and the transmitted light passed through the light reducing section are guided to the first observation optical system; and reflected light reflected by the light splitting section is guided to the second observation optical system, and the second beam splitter is arranged so that
  light from the first illumination light source is incident from the first-and-third-face side through the first beam splitter and the observation target; and
  light from the second illumination light source is incident from a direction in parallel with the first to the fourth faces and reflected to the first-and-third-face side.

10. A beam splitter comprising:
a first plane parallel plate, having first and second faces parallel to each other, with a refractive index higher than a refractive index of air;
a second plane parallel plate, having third and fourth faces arranged to be on the same level with the first and the second faces, respectively, with a refractive index equal to a refractive index of the first plane parallel plate; and
a light splitting section arranged between the first and the second plane parallel plates, the light splitting section configured to allow T % (0<T<100) of incident light incident from a first-and-third-face side to pass therethrough to a second-and-fourth-face side, as well as reflect (100−T) % of the incident light incident from the first-and-third-face side to a direction in parallel with the first to the fourth faces, the first and the second plane parallel plates each provided with a light reducing section in an area thereof through which neither the incident light incident from the first-and-third-face side onto the light splitting section nor transmitted light from the light splitting section to the second-and-fourth-face side pass, the light reducing section configured to allow T % of the incident light incident from the first-and-third-face side to pass therethrough to the second-and-fourth-face side.

* * * * *